United States Patent
Kanazawa et al.

(10) Patent No.: US 10,722,962 B2
(45) Date of Patent: Jul. 28, 2020

(54) SAW WIRE AND CUTTING APPARATUS

(71) Applicant: PANASONIC INTELLECTUAL PROPERTY MANAGEMENT CO., LTD., Osaka (JP)

(72) Inventors: Tomohiro Kanazawa, Osaka (JP); Tetsuji Shibata, Osaka (JP); Kazushige Sugita, Hyogo (JP); Hiroshi Gouda, Osaka (JP); Naoki Kohyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/974,918

(22) Filed: May 9, 2018

(65) Prior Publication Data

US 2018/0326517 A1 Nov. 15, 2018

(30) Foreign Application Priority Data

May 10, 2017 (JP) .................... 2017-094233

(51) Int. Cl.
| | |
|---|---|
| *B23D 61/18* | (2006.01) |
| *B23D 65/00* | (2006.01) |
| *C25D 5/50* | (2006.01) |
| *C25D 7/06* | (2006.01) |
| *C25D 15/00* | (2006.01) |
| *C25D 3/12* | (2006.01) |

(52) U.S. Cl.
CPC .......... *B23D 61/185* (2013.01); *B23D 65/00* (2013.01); *C25D 3/12* (2013.01); *C25D 5/50* (2013.01); *C25D 7/0607* (2013.01); *C25D 15/00* (2013.01)

(58) Field of Classification Search
CPC .... B23D 61/185; B23D 57/00; B23D 57/003; C25D 3/12; C25D 7/0607; C25D 15/00
See application file for complete search history.

(56) References Cited

U.S. PATENT DOCUMENTS

| | | | | |
|---|---|---|---|---|
| 2011/0009039 A1* | 1/2011 | Balagani | ............... | B23D 65/00 451/533 |
| 2013/0032129 A1* | 2/2013 | Otani | .................... | B24D 99/00 125/12 |
| 2015/0068131 A1* | 3/2015 | Sanchez | ............. | B24D 18/0018 51/309 |

FOREIGN PATENT DOCUMENTS

| | | | | |
|---|---|---|---|---|
| JP | 2008-213111 | | 9/2008 | |
| JP | 2010-201541 A | * | 9/2010 | ............. B24B 27/06 |

OTHER PUBLICATIONS

U.S. Appl. No. 15/975,140 to Tomohiro Kanazawa et al., filed May 9, 2018.
U.S. Appl. No. 15/975,183 to Tomohiro Kanazawa et al., filed May 9, 2018.

* cited by examiner

*Primary Examiner* — Pegah Parvini
(74) *Attorney, Agent, or Firm* — Greenblum & Bernstein, P.L.C.

(57) ABSTRACT

A saw wire and various methods of use and manufacture are provided. The saw wire includes a metal wire containing at least one of tungsten and a tungsten alloy. A nickel plating layer is provided over the metal wire. An adhesion layer is provided at an interface between the metal wire and the nickel plating layer. The adhesion layer contains nickel and tungsten. A plurality of abrasive particles are provided at a surface of the nickel plating layer.

20 Claims, 7 Drawing Sheets

| TEMPERATURE [°C] | PEELING OF PLATING |
|---|---|
| 250 | OCCUR |
| 350 | OCCUR |
| 450 | OCCUR |
| 550 | NON |
| 650 | NON |
| 750 | NON |
| 850 | NON |

FIG. 8

SAW WIRE AND CUTTING APPARATUS

CROSS REFERENCE TO RELATED APPLICATION

This application claims the benefit of priority of Japanese Patent. Application Number 2017-094233 filed on May 10, 2017, the entire content of which is hereby incorporated by reference.

BACKGROUND

1. Technical Field

The present disclosure relates to a saw wire and a cutting apparatus including the saw wire.

2. Description of the Related Art

Conventionally, a multi-wire saw for slicing a silicon ingot using wires composed of piano wire, has been known (see reference, for example, to Japanese Unexamined Patent Application Publication No. 2008-213111).

SUMMARY

During the slicing operation of a wire saw, swarf is produced in an amount approximately corresponding to the wire diameter. The aforementioned multi-wire saw uses wires composed of piano wire, however, it, is difficult to reduce the diameter size of piano wire. It is thus difficult, in the present conditions, to manufacture piano wire having a diameter less than 60 μm. In addition, since piano wire has an elastic modulus of at least 150 GPa and at most 250 GPa, even if the piano wire could be thinned, deflection still occurs during the slicing process. Therefore, thinned piano wire is unsuitable for use in wire-saw slicing.

For that reason, it is conceivable that a material different from piano wire is used for manufacturing a saw wire. However, when a saw wire and abrasive particles are fixed together in advance as in the case of a fixed abrasive particle type, there is a problem that, when the saw wire and the abrasive particles are weakly fixed, the abrasive particles might be detached from the saw wire, leading to a decrease in sharpness of the saw wire.

In view of the above, an object of the present disclosure is to provide a saw wire which is high in adhesion to an abrasive particle, and a cutting apparatus including the saw wire.

In order to achieve the above-described object, a saw wire according to an aspect of the present disclosure is a saw wire which includes: a metal wire containing at least one of tungsten and a tungsten alloy; a nickel plating layer provided over the metal wire; an adhesion layer provided at an interface between the metal wire and the nickel plating layer, the adhesion layer containing nickel and tungsten; and a plurality of abrasive particles provided at a surface of the nickel plating layer.

In addition, a saw wire according to another aspect of the present disclosure is a saw wire which includes: a metal wire containing one of tungsten and a tungsten alloy; a plurality of abrasive particles included in a surface of the metal wire; a nickel plating layer provided over the surface of the metal wire; and an adhesion layer containing nickel and tungsten and provided at an interface between the metal wire and the nickel plating layer, and in which the adhesion layer has adhesion force which keeps the nickel plating layer from peeling from the metal wire when the saw wire is twisted.

In addition, a method of slicing an ingot according to an aspect of the present disclosure is a method of slicing an ingot which includes: moving at least one saw wire relative to the ingot, each saw wire including a metal wire containing at least one of tungsten and a tungsten alloy, a nickel plating layer provided over the metal wire, an adhesion layer containing nickel and tungsten provided at an interface between the metal wire and the nickel plating layer, and a plurality of abrasive particles provided at a surface of the nickel plating layer; and dividing the ingot at least into partly-sliced portions by the at least one saw wire.

In addition, a method of manufacturing a saw wire according to an aspect of the present disclosure is a method of manufacturing a saw wire which includes: forming a nickel plating layer on a surface of a metal wire, the metal wire containing at least one of tungsten and a tungsten alloy; depositing a plurality of abrasive particles over the surface of the metal wire; and heat treating the metal wire, on which the nickel plating layer is formed, to form an adhesion layer at an interface between the metal wire and the nickel plating layer, the adhesion layer containing nickel and tungsten.

In addition, a cutting apparatus according to an aspect of the present disclosure includes the saw wire.

According to the present disclosure, it is possible to provide a saw wire which is high in adhesion to an abrasive particle, and a cutting apparatus including the saw wire.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

The following describes in detail a saw wire and a cutting apparatus according to an embodiment of the present disclosure, with reference to the drawings. It should be noted that the embodiment described below indicates one specific example of the present disclosure. The numerical values, shapes, materials, structural components, the disposition and connection of the structural components, etc. described in the following embodiment are mere examples, and do not intend to limit the present disclosure. Furthermore, among the structural components in the following embodiment, components not recited in the independent claim which indicates the broadest concept of the present disclosure are described as arbitrary structural components.

In addition, each diagram is a schematic diagram and not necessarily strictly illustrated. Accordingly, for example, scale sizes, etc., are not necessarily exactly represented. In each of the diagrams, substantially the same structural components are assigned with the same reference signs, and redundant descriptions will be omitted or simplified.

In addition, a term, such as "parallel" or "equal", representing a relationship between the components as well as a term, such as "circular", representing a form, and a numerical range are used in the present description. Such terms and range are each not representing only a strict meaning of the term or range, but implying that a substantially same range, e.g., a range that includes even a difference as small as a few percentage points, is connoted in the term or range.

Embodiment (Cutting Apparatus)

Figure 1:
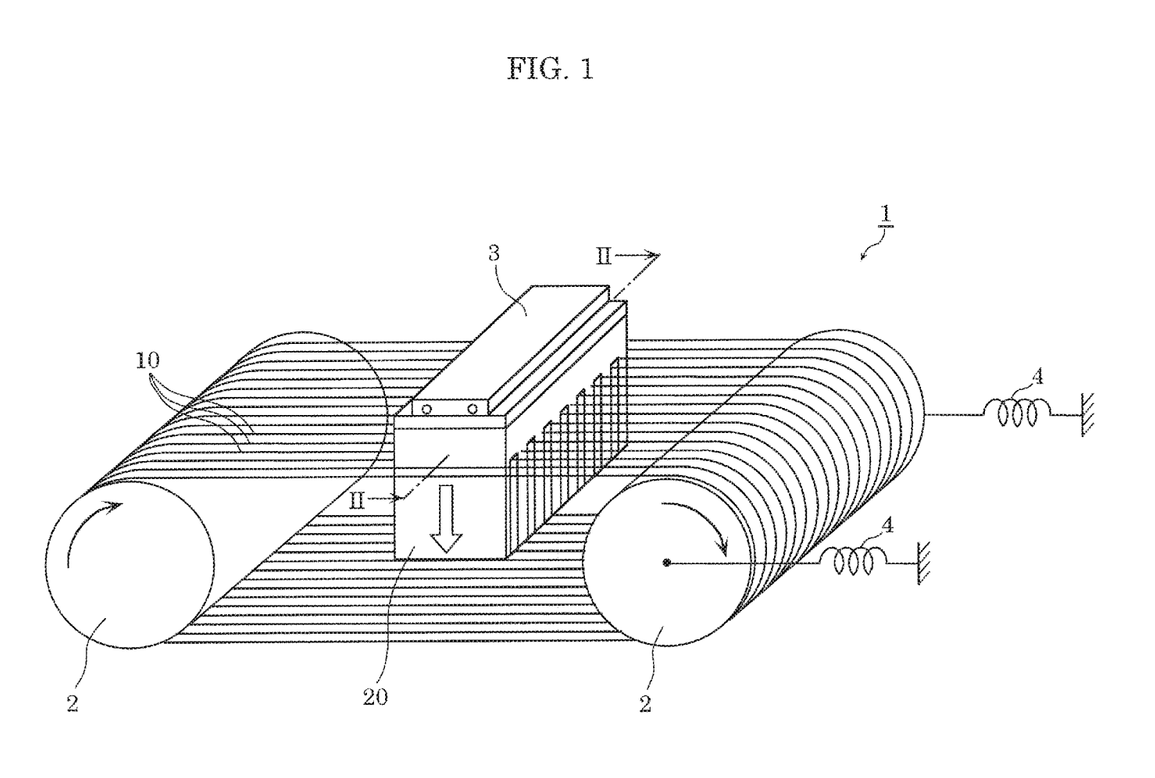
FIG. 1 is a perspective diagram which illustrates a cutting apparatus according to an embodiment.

First, an overview of a cutting apparatus including a saw wire according to the present embodiment will be described with reference to FIG. 1. FIG. 1 is a perspective view illustrating cutting apparatus 1 according to the present embodiment.

As illustrated in FIG. 1, cutting apparatus 1 is a multi-wire saw including saw wire 10. Cutting apparatus 1 produces wafers by, for example, cutting ingot 20 into thin slices. Ingot 20 is, for instance, a silicon ingot including single-crystal silicon. More specifically, cutting apparatus 1 simultaneously produces silicon wafers by slicing ingot 20 using saw wire 10.

It should be noted that ingot 20 is a silicon ingot but is not limited to such. For example, an ingot including other substance such as silicon carbide or sapphire may be used. Alternatively, an object to be cut by cutting apparatus 1 may be concrete, glass, etc.

As illustrated in FIG. 1, cutting apparatus 1 further includes two guide rollers 2, ingot holder 3, and tension releasing device 4.

A single saw wire 10 is looped multiple times over two guide rollers 2. Here, for convenience of explanation, one loop of saw wire 10 is regarded as one saw wire 10, and it is assumed that a plurality of saw wires 10 are looped over two guide rollers 2. Stated differently, in the description below, the plurality of saw wires 10 form a single continuous saw wire 10. It should be noted that the plurality of saw wires 10 may be a plurality of saw wires that are separated from one another.

Each of guide rollers 2 rotates in the state in which saw wire 10 is straightly tightened with a predetermined tension, and thereby causes saw wire 10 to rotate at a predetermined speed. Saw wires 10 are disposed in parallel to one another and are equally spaced. More specifically, each guide roller 2 is provided with grooves positioned at predetermined intervals for saw wires 10 to fit in. The intervals between the grooves are determined according to the thickness of the wafers desired to be sliced off. The width of the groove is substantially the same as diameter φ of saw wire 10.

Tension releasing device 4 is a device that releases tension exerted on saw wire 10. Tension releasing device 4 is, for example, an elastic body such as a coiled or plate spring. As illustrated in FIG. 1, tension releasing device 4 that is a coiled spring, for example, has one end connected to guide roller 2 and the other end fixed to a predetermined wall surface. Tension releasing device 4 is capable of releasing the tension exerted on saw wire 10, by adjusting the position of guide roller 2.

It should be noted that cutting apparatus 1 may include three or more guide rollers 2. Saw wires 10 may be looped over three or more guide rollers 2.

Ingot holder 3 holds ingot 20 which is an object to be cut. Ingot holder 3 pushes ingot 20 through saw wires 10, and thereby ingot 20 is sliced by saw wires 10.

It should be noted that, although not illustrated in the diagram, cutting apparatus 1 may include a feeder that feeds a cutting fluid such as a coolant to saw wires 10.

Figure 2:
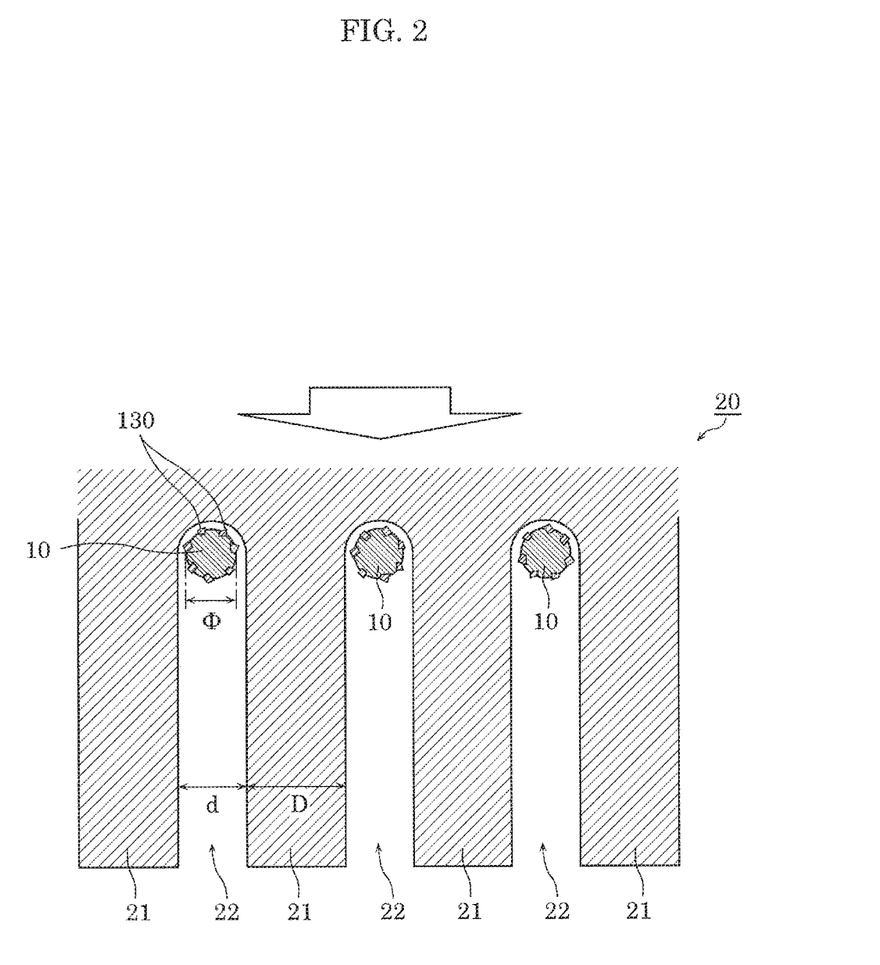
FIG. 2 is a cross-sectional view which illustrates how an ingot is sliced by the cutting apparatus according to the embodiment.

FIG. 2 is a cross-sectional view which illustrates how ingot 20 is sliced by cutting apparatus 1 according to the present embodiment. FIG. 2 illustrates a cross section that is taken along the line illustrated in FIG. 1 and that is orthogonal to the extending direction of saw wire 10. More specifically, FIG. 2 illustrates how three saw wires 10 among saw wires 10 slice ingot 20.

By pushing ingot 20 through saw wires 10, ingot 20 is simultaneously divided into partly-sliced portions 21 by saw wires 10. Space 22 between neighboring partly-sliced portions 21 is a space made by ingot 20 being scraped off by saw wire 10. In other words, the size of space 22 is equivalent to a kerf loss of ingot 20.

Width d of space 22 depends on diameter φ of saw wire 10. Stated differently, width d increases as diameter φ of saw wire 10 becomes larger, and thereby, the kerf loss of ingot 20 increases, Width d decreases as diameter φ of saw wire 10 becomes smaller, and thereby, the kerf loss of ingot 20 decreases.

More specifically, width d of space 22 becomes greater than diameter φ. The difference between width d and diameter φ depends on the size of abrasive particles 130 fixed to saw wire 10 and the oscillation width of the vibrations caused when saw wire 10 rotates around guide rollers 2. Here, the oscillation width of saw wire 10 can be reduced by tightly tensioning saw wire 10. The higher the tensile strength and elastic modulus of saw wire 10 become, it becomes possible to more tightly tension saw wire 10. Thus, the oscillation width of saw wire 10 is reduced and thereby width d of space 22 can be reduced. As a result, it is possible to further reduce the kerf loss of ingot 20.

It should be noted that thickness D of partly-sliced portion 21 depends on the intervals at which saw wires 10 are disposed. Accordingly, wire saws 10 are disposed at intervals each resulting from adding desired thickness D and a predetermined margin. More specifically, a margin is a difference between width d and diameter and is a value determined in accordance with the oscillation width of saw wire 10 and the grain diameter of abrasive particle 130.

Based on what has been described above, diameter φ, the tensile strength, and the elastic modulus of saw wire 10 are significant parameters in order to reduce the kerf loss of ingot 20. More specifically, by decreasing diameter φ of saw wire 10 or increasing the tensile strength and elastic modulus of saw wire 10, the kerf loss of ingot 20 can be reduced.

The following describes the structure and manufacturing method of saw wire 10.

(Saw Wire)

Figure 3:
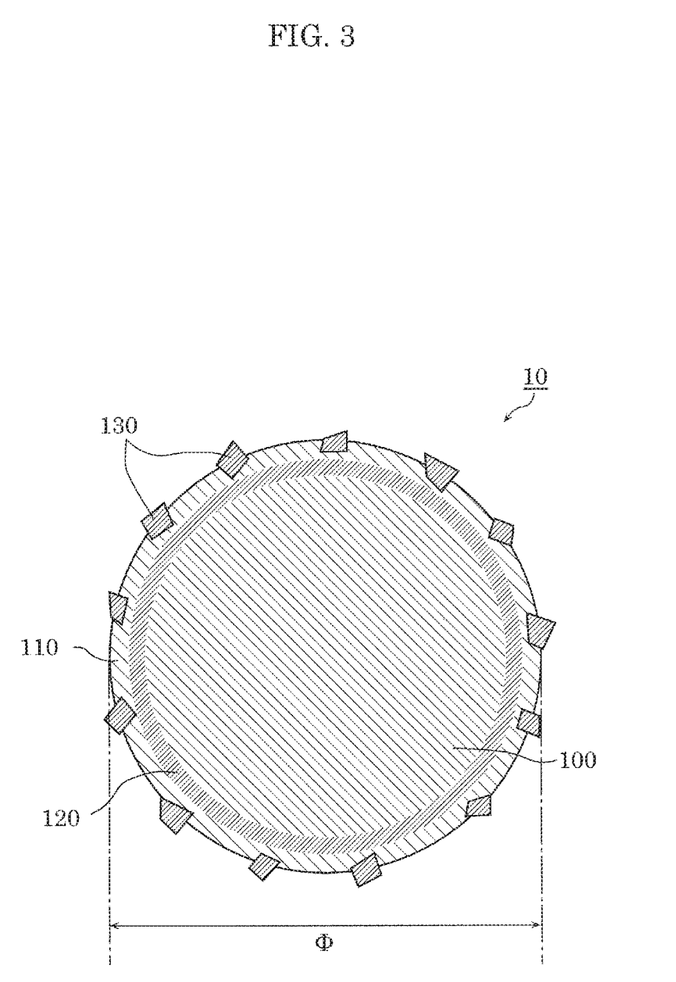
FIG. 3 is a cross-sectional diagram which illustrates a saw wire according to the embodiment.

FIG. 3 is a cross-sectional diagram illustrating saw wire 10 according to the present embodiment. More specifically, FIG. 3 is an enlarged view which illustrates a cross section orthogonal to the extending direction of saw wire 10.

As illustrated in FIG. 3, saw wire 10 includes metal wire 100, nickel plating layer 110, and adhesion layer 120. In addition, saw wire 10 includes a plurality of abrasive particles 130 provided to a surface of saw wire 10. It should be noted that diameter φ of saw wire 10 is a sum of a diameter of metal wire 100, nickel plating layer 110, and adhesion layer 120. Adhesion layer 120 is formed into a predetermined thickness at an interface between metal wire 100 and nickel plating layer 110.

Metal wire 100 is a metal thin wire which includes tungsten (W) an extremely fine. Metal wire 100 comprises pure tungsten. More specifically, the degree of purity of tungsten is 99.9% or higher.

Metal wire 100 which comprises tungsten has a tensile strength per an area of cross-section that increases with a decreasing diameter. Accordingly, use of metal wire 100 which comprises tungsten makes it possible to implement saw wire 10 having small diameter φ and a high tensile strength, and to reduce a kerf loss of ingot 20.

In addition, an elastic modulus of metal wire 100 is at least 350 GPa and at most 450 GPa. It should be noted that the elastic modulus is longitudinal elastic modulus. In other words, metal wire 100 has an elastic modulus approximately twice as high as that of piano wire.

The diameter of metal wire 100 is, for example, at most 80 μm. It should be noted that metal wire 100 which comprises tungsten has a strength per an area of cross-section that increases as metal wire 100 becomes thinner; that is, increases with a decreasing diameter. For example, the diameter of metal wire 100 may be less than or equal to 50 μm or less than or equal to 40 μm. For example, the diameter of metal wire 100 is 20 μm, but may be 10 μm. It should be noted that, in the case where abrasive particles 130 are to be included as in the present embodiment, the diameter of metal wire 100 is, for example, greater than or equal to 10 μm.

Metal wire 100 is formed to be uniform in diameter. Note that diameter of metal wire 100 may not be entirely uniform and the size of diameter may slightly differ by approximately a few percentage points, e.g., 1%, depending on the portion of metal wire 100. Since the diameter of metal wire 100 is at most 80 μm, metal wire 100 has elasticity and thus can be bent easily to a satisfactory extent. Accordingly, it is possible to easily loop saw wire 10 over and across guide rollers 2.

As illustrated in FIG. 3, metal wire 100 has a circular cross-section shape. However, the cross-section shape of metal wire 100 is not limited to this example. The cross-section shape of metal wire 100 may be rectangular such as square, or oval, or other shape.

The tensile strength of metal wire 100 is at least 3500 MPa, for example. The tensile strength of metal wire 100 can be 4000 MPa or higher, for example, by reducing the diameter.

Nickel plating layer 110 is a layer which is plated and provided over the surface of metal wire 100. Nickel plating layer 110 is a thin-film layer comprising nickel (Ni). Nickel plating layer 110 has a thickness of, for example, 1 μm. However, the thickness of nickel plating layer 110 is not limited to this example.

Nickel plating layer 110 tightly and closely covers at least part of the respective abrasive particles 130, and covers the entirely of the surface of metal wire 100 between the plurality of abrasive particles 130. More specifically, as illustrated in FIG. 3, nickel plating layer 110 is provided in an annular shape over the entire circumference of metal wire 100 around an axis of metal wire 100, when viewed in cross-section.

The plurality of abrasive particles 130 are hard particles, such as diamond, cubic boron nitride (CBN), etc. An average grain diameter of the plurality of abrasive particles 130 is less than or equal to 10 μm, for example. However, the average grain diameter of the plurality of abrasive particles 130 is not limited to this example. The plurality of abrasive particles 130 are each provided to the surface of saw wire 10 by being at least partially affixed firmly to nickel plating layer 110.

(Method of Manufacturing Saw Wire)

The following describes a method of manufacturing saw wire 10 having the above-described features. The method of manufacturing saw wire 10 includes a process of manufacturing metal wire 100 which has a reduced diameter size, and a process of fixing the plurality of abrasive particles 130 to metal wire 100.

Figure 4:
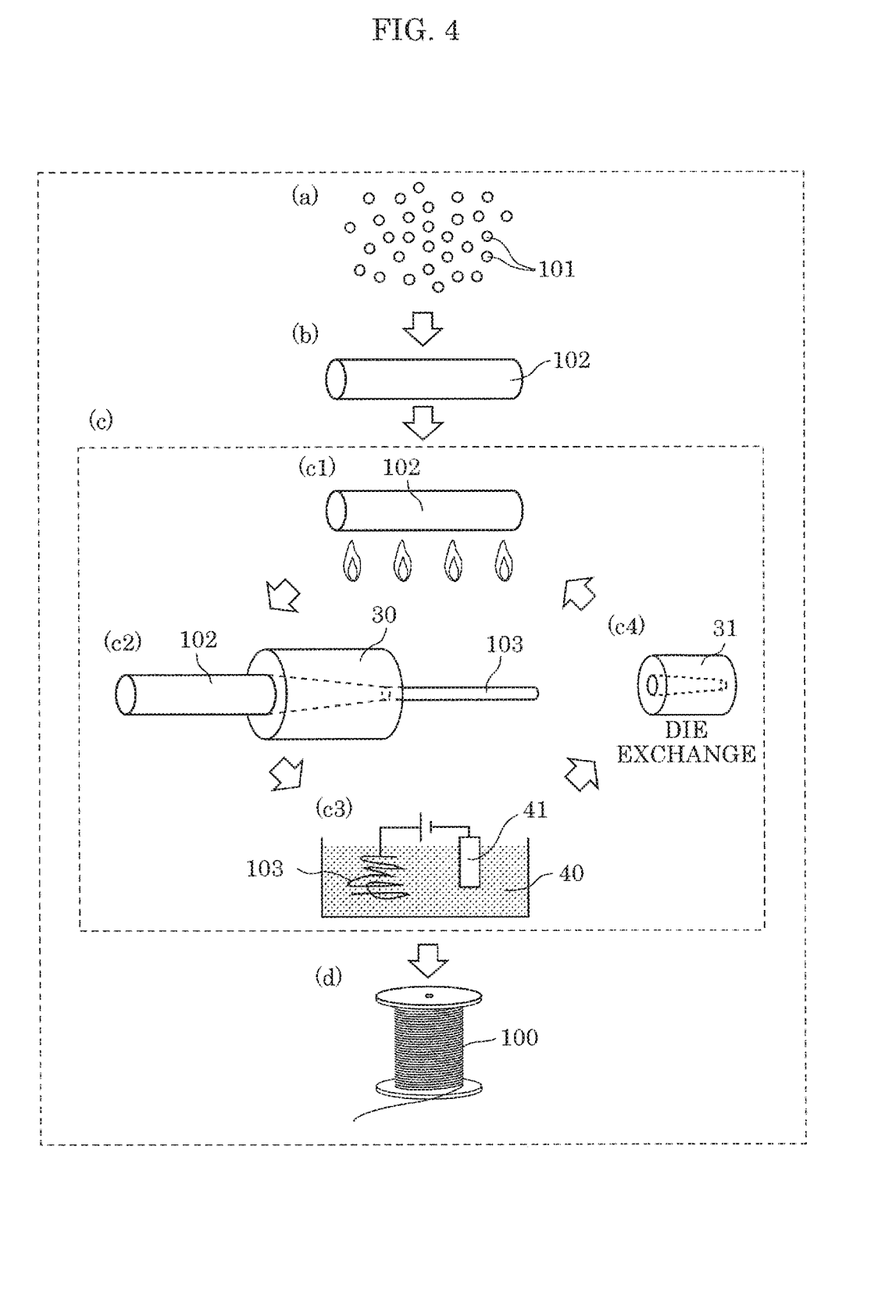
FIG. 4 is a state transition diagram which illustrates the process of manufacturing a metal wire which is thinned, in a method of manufacturing the saw wire according to the embodiment.

First, the process of manufacturing metal wire 100 will be described with reference to FIG. 4. FIG. 4 is a transition diagram which illustrates the process of manufacturing metal wire 100 which has a reduced diameter size, in the method of manufacturing saw wire 10 according to the present embodiment.

First, tungsten powder 101 is prepared, as illustrated in (a) in FIG. 4. An average grain diameter of tungsten powder 101 is 5 μm, for example. However, the average grain diameter of tungsten powder 101 is not limited to this example.

Next, by pressing and sintering tungsten powder 101, an ingot containing tungsten is produced. By performing, onto the ingot, a swaging processing of extending an ingot by press-forging the ingot from its periphery, tungsten wire 102 having a wire shape is produced, as illustrated in (b) in FIG. 4. For example, tungsten wire 102 having a wire shape has a diameter of approximately 3 mm whereas the ingot containing tungsten that is a sintered body has a diameter of approximately 15 mm.

Next, drawing processing using wire drawing dies is carried out, as illustrated in (c) in FIG. 4.

To be specific, firstly, tungsten wire 102 is annealed, as illustrated in (c1) in FIG. 4. More precisely, tungsten wire 102 is heated not only directly with a burner, but is heated also by applying electrical current to tungsten wire 102. The annealing process is performed in order to eliminate processing distortion generated in the swaging or drawing processing.

Next, drawing of tungsten wire 102 using wire drawing die 30, i.e., wire drawing process, is performed, as illustrated in (c2) in FIG. 4. It should be noted that since tungsten wire 102 is rendered ductile after having been heated in the previous step of annealing process, the wire drawing process can be easily carried out. By reducing the diameter size of tungsten wire 102, the strength of tungsten wire 102 per an area of cross-section becomes higher. In other words, tungsten wire 103 whose diameter size is rendered thinner in the drawing process has a strength per an area of cross-section higher than that of tungsten wire 102. It should be noted that the diameter of tungsten wire 103 is, for example, 0.6 mm, but is not limited to this example.

Next, through the electrolytic polishing of tungsten wire 103 after the drawing process, the surface of tungsten wire 103 is rendered smooth, as illustrated in (c3) in FIG. 4. The electrolytic polishing process is carried out by conducting electricity between tungsten wire 103 and counter electrode 41 such as a carbon rod, in the state in which tungsten wire 103 and counter electrode 41 are bathed into electrolyte 40, e.g., aqueous sodium hydroxide.

Next, die exchange is performed, as illustrated in (c4) in FIG. 4. More specifically, wire drawing die 31 with a pore diameter smaller than that of wire drawing die 30 is selected as a die to be used in the next drawing processing. It should be noted that wire drawing dies 30 and 31 are, for example, diamond dies containing sintered diamond, single-crystal diamond, or the like.

The processes from (c1) to (c4) illustrated in FIG. 4 are repeatedly performed until the diameter of tungsten wire 103 is thinned down to a desired diameter (specifically, less than, or equal to 80 μm). At this time, the drawing process illustrated in (c2) in FIG. 4 is performed by adjusting the form as well as hardness of wire drawing die 30 or 31, a lubricant to be used, and the temperature of the tungsten wire, in accordance with the diameter of tungsten wire to be processed.

Similarly, in the annealing process illustrated in (c1) in FIG. 4, annealing conditions are adjusted in accordance with the diameter of the tungsten wire to be processed. Through the annealing process, an oxidation product is attached to the surface of the tungsten wire. It is possible to adjust the amount of oxidation products to be attached to the surface of the tungsten wire, by adjusting the annealing conditions.

More specifically, the larger the diameter of the tungsten wire is, at higher temperature the tungsten wire is annealed, and the smaller the diameter of the tungsten wire is, at lower temperature the tungsten wire is annealed. To be more concrete, in the case where the diameter of the tungsten wire is large, for example, the tungsten wire is annealed at the temperature between 1400 degrees Celsius and 1800 degrees Celsius in the annealing process carried out in the first drawing processing. In the final annealing process carried out in the final drawing processing in which the tungsten wire is thinned down to finally have a desired diameter, the tungsten wire is heated at the temperature between 1200 degrees Celsius and 1500 degrees Celsius. It should be noted that, in the final annealing process, electricity need not be conducted to the tungsten wire.

Moreover, an annealing process may be omitted when a drawing processing is repeated. For example, the final annealing process may be omitted. More specifically, the final annealing process may be omitted and a lubricant, as well as the form and hardness of a wire drawing die may be adjusted.

In the drawing process after the final annealing process (i.e., the final drawing process), a single-crystal diamond die containing single-crystal diamond is used as wire drawing die 31. Diamond particles are less likely to be detached in the process using the single-crystal diamond die, and thus a streak is less likely to be formed on the tungsten wire after the drawing process. It is thus possible to reduce surface roughness Ra of the tungsten wire which has a desired diameter.

In addition, when the drawing process is repeated, drawing is started using the single-crystal diamond die having a pore diameter of 200 μm, when a weight ratio of an amount of oxide included in the tungsten wire having a mass of 50 MG is in a range from 0.2% to 0.5%. In this manner, metal wire 100 having surface roughness Ra less than or equal to 0.15 μm is manufactured, as illustrated in (d) in FIG. 4.

Figure 5:
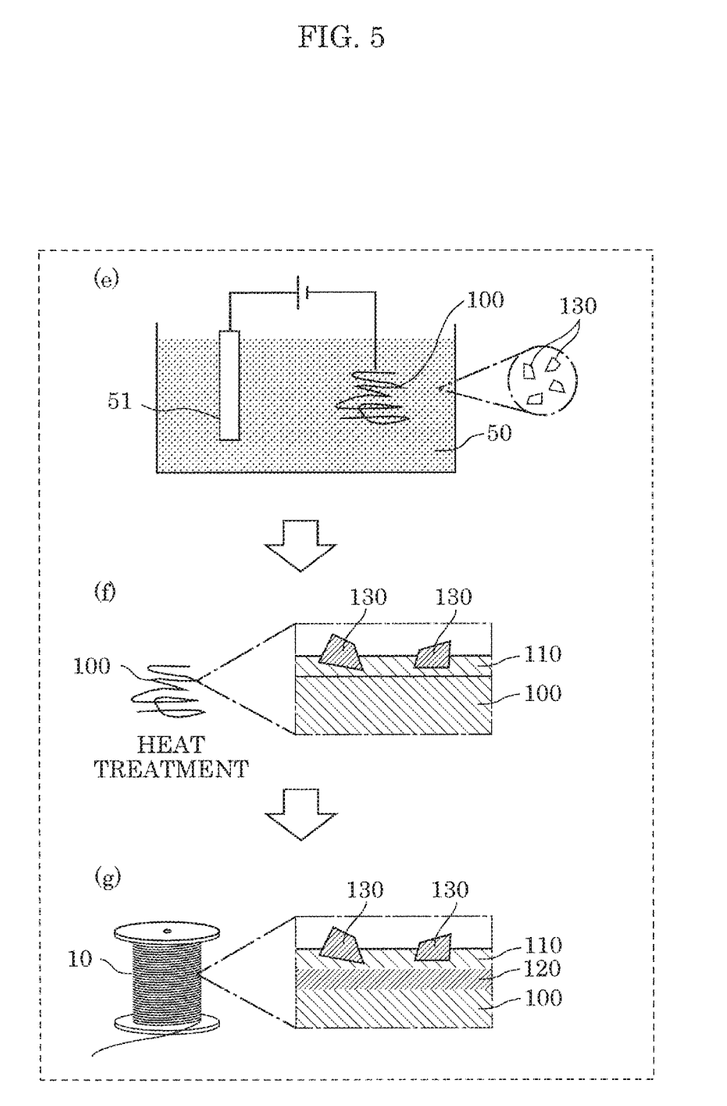
FIG. 5 is a state transition diagram which illustrates the process of fixing abrasive particles to the metal wire, in the method of manufacturing the saw wire according to the embodiment.

Next, the process of fixing the plurality of abrasive particles 130 to metal wire 100 will be described with reference to FIG. 5. FIG. 5 is a state transition diagram which illustrates the process of fixing the plurality of abrasive particles 130 to metal wire 100, in the method of manufacturing saw wire 10 according to the present embodiment. It should be noted that a portion of plating solution 50 and a surface layer portion of metal wire 100 are schematically illustrated in enlarged manner in (e) in FIG. 5 and in (f) and (g) in FIG. 5, respectively.

First, nickel plating layer 110 is formed on a surface of metal wire 100, and abrasive particles 130 are electrodeposited. More specifically, as illustrated in (e) in FIG. 5, electricity is conducted between nickel plate 51 and metal wire 100, in the state where nickel plate 51 and metal wire 100 are bathed into plating solution 50. It should be noted that plating solution 50 is a liquid including nickel sulfate, nickel chloride, and boracic acid. According to the present embodiment, a plurality of abrasive particles 130 are dispersedly mixed in plating solution 50. In this manner, as illustrated in (f) in FIG. 5, a plurality of abrasive particles 130 are electrodeposited on the surface of metal wire 100, and nickel plating layer 110 is formed so as to fill the gap between the plurality of abrasive particles 130.

Next, as illustrated in (f) in FIG. 5, heat treatment is carried out on metal wire 100 on which nickel plating layer 110 is formed. Adhesion layer 120 is formed by the heat treatment. It should be noted that, as illustrated by an enlarged diagram in (f) in FIG. 5, adhesion layer 120 is not formed before the heat treatment; that is, immediately after nickel plating layer 110 is formed.

The heat treatment is carried out at the temperature of 650 degrees Celsius, for example. When the temperature is excessively low, adhesion layer 120 is not formed. When the temperature is excessively high, the strength of metal wire 100 decreases. In view of the above, the heat treatment is carried out at the temperature ranging from 450 degrees Celsius to 850 degrees Celsius, for example.

The heat treatment is performed for one to five seconds, for example. It should be noted that, when abrasive particles 130 are diamond particles, the heat treatment is carried out under the oxygen-free atmosphere, such as under an argon atmosphere, so as to inhibit oxidation of diamond.

With the processes as described above, saw wire 10 is manufactured as illustrated in (g) in FIG. 5.

The heat treatment is carried out after the nickel plating process and electrodepositing, thereby increasing an adhesion strength between metal wire 100 and nickel plating layer 110.

It should be noted that each of FRI. 4 and FIG. 5 schematically illustrates each of the processes of the method of manufacturing saw wire 10. Each of the processes may be performed separately, or may be performed through an in-line process. For example, a plurality of wire drawing dies may be aligned in a descending order of pore diameters in a production line, and heating devices or the like for conducting an annealing process may be placed between the wire drawing dies. In addition, an electrolytic polishing device, a plating device, and a heating device may be sequentially placed in a position subsequent to the wire drawing die having the smallest pore diameter.

(Relationship between Heat Treatment and Peeing of Plating)

Here, the relationship between the temperature of heat treatment after nickel plating layer 110 is formed and detachment (peeling of plating) of nickel plating layer 110 will be described.

Figure 6:
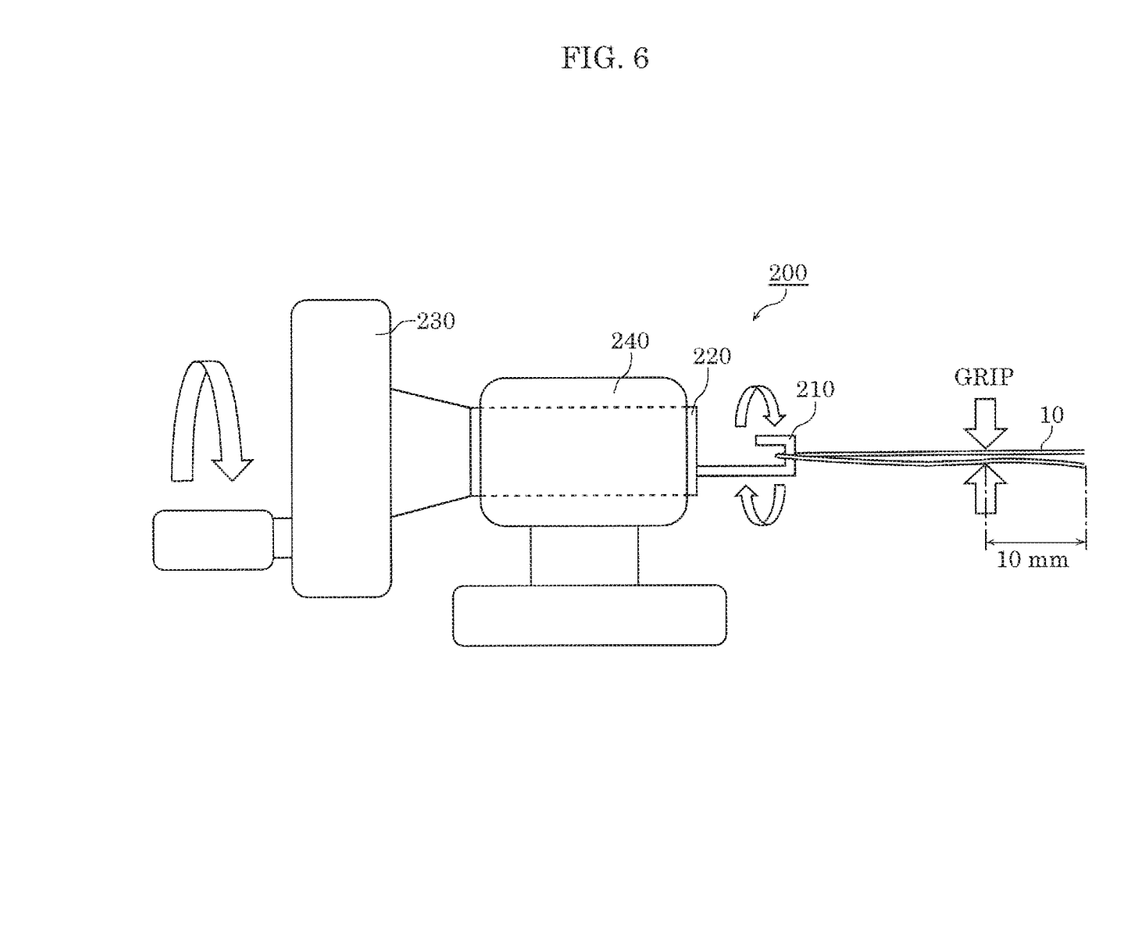
FIG. 6 is a schematic diagram which illustrates a twisting device which applies twisting to the saw wire according to the embodiment.

Here, saw wire 10 is twisted multiple times using twisting device 200 illustrated in FIG. 6, and saw wire 10 is observed to see whether or not peeling of plating occurs. FIG. 6 is a schematic diagram illustrating twisting device 200 which applies twisting to saw wire 10 according to the present embodiment.

In twisting device 200 illustrated in FIG. 6, hook 210 is a part on which saw wire 10 is hooked, and coupled to handle 230 via rotator 220 having a cylindrical shape. Rotator 220 is rotatably supported by support 240, and rotates according to rotation of handle 230. Hook 210 also rotates according to rotation of rotator 220. For example, the rotation frequency of handle 230 is the same as the rotation frequency of hook 210.

First, as object to be twisted, a plurality of saw wires 10 which have been heat treated at different temperatures are prepared. More specifically, seven types of saw wires 10 are prepared which are obtained by applying heat 2) treatment between 250 degrees Celsius and 850 degrees Celsius with 100 degrees Celsius increments.

The prepared saw wires 10 are each cut in a length of 60 mm and folded into a half length, and thereby formed into a U-shape. As illustrated in FIG. 6, a folded portion of each of saw wires 10 is hooked on hook 210 of twisting device 200. Then, a position that is 10 mm away from an end of saw wire 10 is gripped, and pulled to the side opposite to hook 210 with a power of 5N. Furthermore, handle 230 is turned while saw wire 10 is pulled, thereby rotating hook 210 a predetermined number of times. Subsequently, twisted saw wire 10 is observed using a microscope, thereby evaluates occurrence or non-occurrence of peeling of plating.

Figure 7:
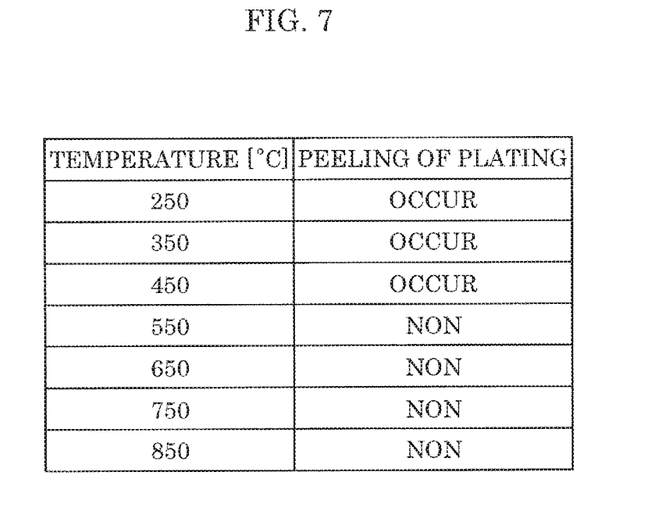
FIG. 7 is a diagram which illustrates a relationship between a heating temperature during a heat treatment and peeling of plating of the saw wire according to the embodiment.

FIG. 7 is a diagram which illustrates a relationship between a heating temperature during the heat treatment and peeling of plating of saw wire 10. FIG. 7 indicates occurrence or non-occurrence of peeling of plating when saw wire 10 is twisted 40 times and the rate of rotation of the twisting is one rotation per second.

Figure 8:
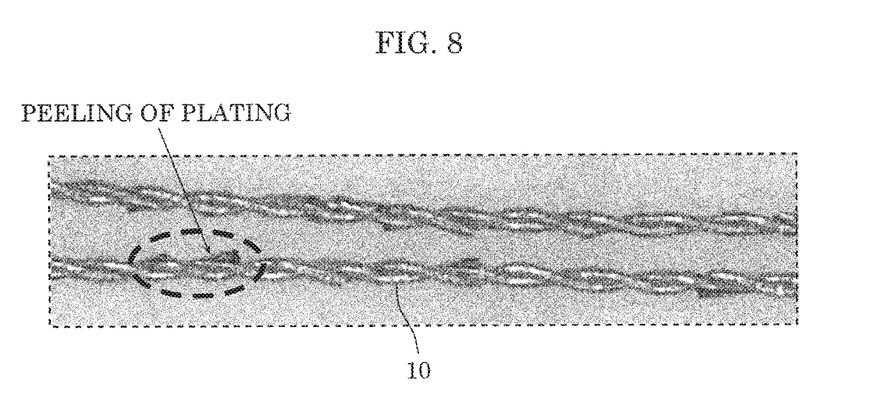
FIG. 8 is a diagram which illustrates the saw wire to which twisting is applied according to the embodiment.

As illustrated in FIG. 7, peeling of plating as illustrated in FIG. 8 occurred when the heating temperature is 250 degrees Celsius, 350 degrees Celsius, and 450 degrees Celsius. Here, FIG. 8 is a diagram which illustrates saw wire 10 which is twisted. In FIG. 8, it is visually recognized that nickel plating layer 110 peels at the portion enclosed by a bold dashed line. It should be noted that it is confirmed that the amount of detachment of nickel plating layer 110 increases with a decrease in the heating temperature.

Meanwhile, peeling of plating is not confirmed when the heating temperature is 550 degrees Celsius, 650 degrees Celsius, 750 degrees Celsius, and 850 degrees Celsius as illustrated in FIG. 7. In view of the above, nickel plating layer 110 is not detached when the heating temperature is 550 degrees Celsius or higher, whereas nickel plating layer 110 peels when the heating temperature is 450 degrees Celsius or lower.

When the heating temperature is excessively high, the tensile strength of saw wire 10 decreases. More specifically, the tensile strength of saw wire 10 heated at 750 degrees Celsius is lower than the tensile strength of saw wire 10 heated at 650 degrees Celsius. Accordingly, the heating temperature increased too high is not advisable, and the heating temperature of, for example, 850 degrees Celsius or lower is preferable.

(Advantageous Effects, etc.)

As described above, saw wire 10 according to the present embodiment is a saw wire having a surface including a plurality of abrasive particles 130. The saw wire includes: metal wire 100 containing one of tungsten and a tungsten alloy; nickel plating layer 110 provided over a surface of metal wire 100; and adhesion layer 120 containing nickel and tungsten and provided at an interface between i fetal wire 100 and nickel plating layer 110. Adhesion layer 120 keeps nickel plating layer 110 from peeling from metal wire 100 when saw wire 10 is twisted. In addition, for example, a diameter of metal wire 100 is at most 80 μm.

With this configuration, since metal wire 100 contains tungsten as a major component, the tensile strength of metal wire 100 per a cross-sectional area increases and thereby tolerance against breakage is improved, as metal wire 100 is rendered thinner. Accordingly, saw wire 10 can be looped over guide rollers 2 with a strong tension. Therefore, the vibrations of saw wire 10 caused during the process of cutting ingot 20 can be reduced. Thus, it is possible to reduce the amount of swarf produced when ingot 20 is sliced, i.e., the kerf loss of ingot 20.

According to the present embodiment, adhesion layer 120 is provided between metal wire 100 and nickel plating layer 110, and thus adhesion between metal wire 100 and nickel plating layer 110 increases. It is thus possible to more firmly fix abrasive particles 130 covered by nickel plating layer 110 and metal wire 100. Accordingly, detachment of abrasive particles 130 is inhibited. In addition, since the adhesion between metal wire 100 and nickel plating layer 110 is high, it is possible to inhibit nickel plating layer 110 from peeling together with abrasive particles 130. Accordingly, it is possible to inhibit a decrease in sharpness of saw wire 10.

In addition, cutting apparatus 1 according to the present embodiment includes saw wire 10.

With this configuration, the diameter of saw wire 10 is reduced, and thus it is possible to increase the number of wafers cut out from a single ingot 20. In addition, it is possible to reduce the amount of swarf produced when ingot 20 is sliced. This allows the effective use of limited resources such as the materials of ingot 20. This also allows inhibiting a decrease in sharpness of saw wire 10, and thus it is possible to slice ingot. 20 with a high degree of accuracy.

(Others)

Although the saw wire and the cutting apparatus according to the present disclosure have been described based on the above-described embodiment, the present disclosure is not limited to the above-described embodiment.

For example, although the case where metal wire 100 contains pure tungsten has been described in the above-described embodiment, the present disclosure is not limited to this example. Metal wire 100 may contain rhenium-tungsten (ReW) alloy.

More specifically, metal wire 100 may contain tungsten as a major component, and a predetermined proportion of rhenium. The rhenium content of metal wire 100 is at least 0.1 wt % and at most 10 wt % with respect to a total weight of rhenium and tungsten. Although the rhenium content, specifically, is 3 wt %, it may be 1 wt %.

Since metal wire 100 contains rhenium, it is possible to increase the strength of metal wire 100 to be higher than the strength of a pure tungsten wire. The tensile strength of a ReW wire is, for example, at least 3500 MPa and at most 6000 MPa. Accordingly, metal wire 100 has improved tolerance against breakage even after the thinning process, and therefore, it is possible to realize the tensile strength equal to or higher than that of piano wire.

Accordingly, saw wire 10 can be looped over guide rollers 2 with a stronger tension. Therefore, the vibrations of saw wire 10 can be further reduced. Thus, it is possible to further reduce the kerf loss of ingot 20.

In addition, for example, saw wire 10 may include a metal wire which contains tungsten and is dope with potassium (K) (hereinafter referred to as a potassium-doped tungsten wire), instead of metal wire 100 containing pure tungsten or the ReW alloy.

The potassium-doped tungsten wire contains tungsten as a major component, and a predetermined proportion of potassium. The potassium content of the potassium-doped tungsten wire is at least 0.005 wt % and at most 0.010 wt % with respect to a total weight of potassium and tungsten.

The potassium-doped tungsten wire has a tensile strength per an area of cross-section that increases with decreasing diameter φ. Stated differently, with the use of such a potassium-doped tungsten wire, it is possible to realize a saw wire having small diameter φ and a high tensile strength, and thereby to reduce the kerf loss of ingot 20.

The tensile strength, elastic modulus, diameter φ, etc. of the potassium-doped tungsten wire are respectively the same as those of metal wire 100 containing the ReW alloy.

Accordingly, tungsten contains a subtle, amount, of potassium, and thereby crystal grain growth in the radial direction of the potassium-doped tungsten wire is inhibited. Therefore, the saw wire including the potassium-doped tungsten wire increases its strength at high temperature, as compared to pure tungsten.

In addition, for example, although the case where electrodepositing of abrasive particles 130 and forming of nickel plating layer 110 are simultaneously carried out has been described in the above-described embodiment, the present disclosure is not limited to this example. One of the electrodepositing and the plating processing may be carried out previous to the other.

Moreover, cutting apparatus 1 is not limited to a multi-wire saw, and may be, for example, a wire sawing apparatus that cuts out a wafer one by one by slicing ingot 20 using one wire saw 10.

It should be noted that the present disclosure also includes other forms in which various modifications apparent to those skilled in the art are applied to the embodiments or forms in which structural components and functions in the embodiments are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A saw wire, comprising:
a metal wire containing at least one of tungsten and a tungsten alloy;
a nickel plating layer provided over the metal wire;
an adhesion layer provided at an interface between the metal wire and the nickel plating layer, the adhesion layer containing nickel and tungsten; and
a plurality of abrasive particles provided at a surface of the nickel plating layer,
wherein the nickel plating layer consisting of nickel.

2. The saw wire according to claim 1, wherein
the adhesion layer keeps the nickel plating layer from peeling from the metal wire when the saw wire is twisted.

3. The saw wire according to claim 2, wherein
the adhesion layer keeps the nickel plating layer from peeling from the metal wire when the saw wire is twisted 40 times and a rate of rotation of twisting is one rotation per second.

4. The saw wire according to claim 1, wherein
a diameter of the metal wire is at most 80 μm.

5. The saw wire according to claim 4, wherein
the diameter of the metal wire is at least 10 μm.

6. The saw wire according to claim 1, wherein
a diameter of the metal wire is at least 10 μm.

7. The saw wire according to claim 1, wherein
a diameter of the metal wire is uniform.

8. The saw wire according to claim 1, wherein
the adhesion layer is formed through heat treatment of the metal wire and the nickel plating layer at a temperature ranging from 450 degrees Celsius to 850 degrees Celsius.

9. The saw wire according to claim 1, wherein
a tensile strength of the metal wire is at least 3500 MPa.

10. The saw wire according to claim 1, wherein
an elastic modulus of the metal wire is at least 350 GPa and at most 450 GPa.

11. The saw wire according to claim 1, wherein
the tungsten alloy includes rhenium and tungsten, and
a rhenium content of the tungsten alloy is at least 0.1 wt % and at most 10 wt % with respect to a total weight of rhenium and tungsten.

12. The saw wire according to claim 1, wherein
the metal wire containing tungsten is doped with potassium, and
a potassium content of the metal wire is at most 0.010 wt % with respect to a total weight of potassium and tungsten.

13. The saw wire according to claim 12, wherein
the potassium content of the metal wire is at least 0.005 wt % with respect to the total weight of potassium and tungsten.

14. The saw wire according to claim 1, wherein
the plurality of abrasive particles include at least one of diamond and cubic boron nitride.

15. The saw wire according to claim 1, wherein
an average grain diameter of the plurality of abrasive particles is at most 10 μm.

16. A cutting apparatus, comprising the saw wire according to claim 1.

17. The saw wire according to claim 1, wherein
the adhesion layer has adhesion force which keeps the nickel plating layer from peeling from the metal wire when the saw wire is twisted.

18. A method of slicing an ingot, the method comprising:
moving at least one saw wire relative to the ingot, each saw wire including a metal wire containing at least one of tungsten and a tungsten alloy, a nickel plating layer provided over the metal wire, an adhesion layer containing nickel and tungsten provided at an interface between the metal wire and the nickel plating layer, a plurality of abrasive particles provided at a surface of the nickel plating layer, the nickel plating layer consisting of nickel; and
dividing the ingot at least into partly-sliced portions by the at least one saw wire.

19. A method of manufacturing a saw wire, the method comprising:
forming a nickel plating layer on a surface of a metal wire, the nickel plating layer consisting of nickel, the metal wire containing at least one of tungsten and a tungsten alloy;

depositing a plurality of abrasive particles over the surface of the metal wire; and heat treating the metal wire, on which the nickel plating layer is formed, to form an adhesion layer at an interface between the metal wire and the nickel plating layer, the adhesion layer containing nickel and tungsten.

20. The method according to claim 19, wherein
the heat treating is carried out at a temperature ranging from 450 degrees Celsius to 850 degrees Celsius.

* * * * *